United States Patent
Hori et al.

(10) Patent No.: US 7,446,070 B2
(45) Date of Patent: Nov. 4, 2008

(54) EXHAUST GAS-PURIFYING CATALYST

(75) Inventors: Asuka Hori, Kakegawa (JP); Keiichi Narita, Kakegawa (JP); Yasunori Sato, Kakegawa (JP); Hirohisa Tanaka, Ikeda (JP); Ichiro Takahashi, Ikeda (JP); Nobuhiko Kajita, Ikeda (JP)

(73) Assignees: Cataler Corporation, Shizuoka (JP); Daihatsu Motor Co., Ltd., Osaka (JP)

( * ) Notice: Subject to any disclaimer, the term of this patent is extended or adjusted under 35 U.S.C. 154(b) by 0 days.

(21) Appl. No.: 11/529,465

(22) Filed: Sep. 27, 2006

(65) Prior Publication Data
US 2007/0021294 A1 Jan. 25, 2007

Related U.S. Application Data

(63) Continuation of application No. PCT/JP2004/004509, filed on Mar. 30, 2004.

(51) Int. Cl.
*B01J 29/06* (2006.01)

(52) U.S. Cl. .............. 502/60; 502/63; 502/64; 502/65; 502/66; 502/527.12; 502/527.13

(58) Field of Classification Search ............... 502/60, 502/63, 64, 65, 66, 527.12, 527.13
See application file for complete search history.

(56) References Cited

U.S. PATENT DOCUMENTS

| 5,628,975 | A | * | 5/1997 | Horiuchi et al. | 423/213.2 |
| 5,879,645 | A | * | 3/1999 | Park et al. | 423/213.2 |
| 7,205,257 | B2 | * | 4/2007 | Tanaka et al. | 502/327 |

FOREIGN PATENT DOCUMENTS

| JP | 2002-045702 | 2/2002 |
| JP | 2002-066327 | 3/2002 |
| JP | 2003-093887 | 4/2003 |
| JP | 2004-041866 | 2/2004 |

* cited by examiner

*Primary Examiner*—Elizabeth D Wood
(74) *Attorney, Agent, or Firm*—Morristown & Foerster LLP

(57) ABSTRACT

An exhaust gas-purifying catalyst includes a zeolite and a perovskite composite oxide containing palladium placed at its B site.

23 Claims, 1 Drawing Sheet

EXHAUST GAS-PURIFYING CATALYST

CROSS-REFERENCE TO RELATED APPLICATIONS

This is a Continuation Application of PCT Application No. PCT/JP2004/004509, filed Mar. 30, 2004, which was published under PCT Article 21 (2) in Japanese.

BACKGROUND OF THE INVENTION

1. Field of the Invention

The present invention relates to an exhaust gas-purifying catalyst, and in particular to a motor vehicle exhaust gas-purifying catalyst containing a zeolite and a perovskite composite oxide.

2. Description of the Related Art

In recent years, the regulation of exhaust gas of motor vehicles is being made stricter, increasing the necessity for further decreasing the amounts of hydrocarbons (HC), carbon monoxide (CO) and nitrogen oxides ($NO_x$) in the exhaust gases. Conventionally, a carried catalyst in which a noble metal (catalyst active component) such as rhodium (Rh) or palladium (Pd) is carried on a porous carrier has been widely employed as an exhaust gas-purifying catalyst for motor vehicles. Such a carried catalyst is called a three-way catalyst because it can oxidize CO and HC and reduce $NO_x$ in the exhaust gas simultaneously.

The fuel is fed in a greater amount into a motor vehicle engine during startup, leading to a smaller air-to-fuel ratio (A/F) in the exhaust gas, i.e., a so-called rich (reductive) atmosphere, resulting in increase in the amount of HC and CO in the exhaust gas. In addition, the exhaust gas-purifying function is not exhibited sufficiently during the engine startup at which the catalyst is at low temperature, resulting in decrease particularly in the HC-purifying efficiency.

Catalysts are known, which use a zeolite adsorbent that adsorbs cold HC, in order to improve the purification efficiency of the HC in cold exhaust gas emitted during motor vehicle engine startup. For example, Jpn. Pat. Appln. KOKAI Publication No. 2-56247 discloses an exhaust gas-purifying catalyst having a first catalyst layer containing a zeolite as a principal component and a second catalyst layer formed thereon containing a noble metal catalyst as a principal component. Jpn. Pat. Appln. KOKAI Publication No. 7-96183 discloses an exhaust gas-purifying catalyst of a structure in which an HC-adsorbing layer containing a zeolite as a principal component and a porous HC-oxidizing layer containing palladium oxide are laminated via a barrier layer. Further, Jpn. Pat. Appln. KOKAI Publication No. 7-148429 discloses a catalyst having an HC-adsorbing layer containing a zeolite and a catalyst metal dispersion layer formed thereon.

On the other hand, Jpn. Pat. Appln. KOKAI Publication No. 62-282642 discloses a catalyst carrying palladium as a perovskite composite oxide, as a catalyst that is suppressed in sintering of palladium under a high-temperature reductive atmosphere to enhance purification efficiency. Further, Jpn. Pat. Appln. KOKAI Publication No. 3-131342 discloses a perovskite composite oxide containing lanthanum aluminate added with platinum or palladium.

However, these prior art catalysts are still low in efficiency of purifying the HC in the cold motor vehicle exhaust gas and difficult to maintain the catalytic activity over a long period of time.

Thus, an object of the present invention is to provide an exhaust gas-purifying catalyst that is superior in efficiency of purifying the HC in the cold exhaust gas emitted during engine startup of a motor vehicle and retains its HC-purifying activity for a long period of time.

BRIEF SUMMARY OF THE INVENTION

The present inventors have made intensive studies in an attempt to achieve the object above, and found that a catalyst containing both a zeolite and a palladium-containing perovskite composite oxide has a HC-purifying efficiency not foreseeable from a catalyst containing a zeolite and palladium alone or a catalyst consisting of a palladium-containing perovskite composite oxide alone (synergistic effect).

Thus, according to the present invention there is provided an exhaust gas-purifying catalyst comprising a zeolite and a perovskite composite oxide having palladium placed at its B site.

DETAILED DESCRIPTION OF THE INVENTION

Figure 1:
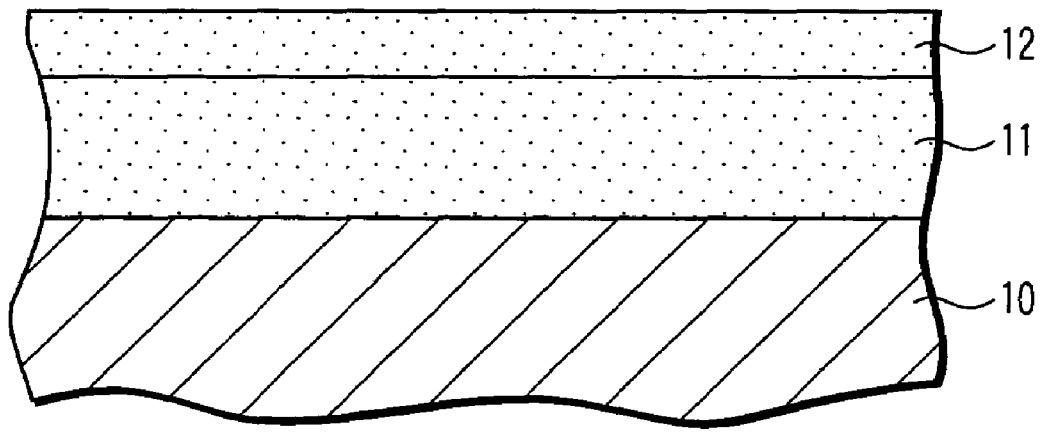
FIG. 1 is a schematic sectional view illustrating a structure of a catalyst according to a first embodiment of the present invention.

The present invention will be described in more detail below.

An exhaust gas-purifying catalyst according to the present invention comprises a zeolite and a perovskite composite oxide containing palladium placed at its B site. The zeolite adsorbs cold HC during start-up of a motor vehicle engine. The perovskite composite oxide purifies the HC released from the zeolite while hot.

The zeolite used in the present invention includes ZSM-5 zeolite, mordenite, ferrierite, Y zeolite, and β zeolite. Among them, use of β-zeolite, which is superior in adsorption of the HC in the exhaust gas, is preferable. The zeolite used preferably has a silicon/aluminum (Si/Al) molar ratio of 300 to 900, from the viewpoint of the durability of the catalyst.

Generally, a perovskite composite oxide is represented by a formula: $ABO_3$, where A represents a cation located at the A site, and B represents a cation located at the B site. In the perovskite composite oxide containing palladium (Pd) at the B site used in the present invention, such behavior is repeatedly exhibited that Pd solid-solutions into the perovskite composite oxide under an oxidative (lean) atmosphere and Pd precipitates onto the surface of the perovskite composite oxide under a reductive atmosphere, thus, prohibiting grain growth and deterioration in purification efficiency over a long period of time.

The Pd-containing perovskite composite oxide used in the present invention can be preferably represented by a general formula (1):

$$(A^1)_a(A^2)_{1-a}(Pd)_b(B')_{1-b}O_3 \tag{1}$$

where each of a and b denotes the atomic proportions of the respective elements, wherein $0<a\leq1$, and $0<b<1$. $A^1$ and optional $A^2$ occupy the A site, while Pd and B' occupy the B site.

In the formula (1), $A^1$ represents at least one first rare-earth element selected from the group consisting of rare earth elements taking no valence other than trivalence. $A^2$ represents at least one second rare-earth element selected from the group consisting of rare-earth elements excluding the rare-earth elements that can have a valence lower than trivalence. B' represents at least one element selected from the group consisting of transition elements excluding cobalt (Co), palladium (Pd) and rare-earth elements (hereinafter, referred to as "specified transition element(s)"), and aluminum (Al).

The perovskite composite oxide represented by the formula (1) has a perovskite structure, and rare-earth elements are placed at its A sites. More specifically, the first rare-earth element $A^1$ taking no valence other than trivalence is always placed at the A site, but no rare-earth element that can have a valence lower than trivalence (for example, rare-earth element that can take both bivalence and trivalence, such as Sm, Eu, Tm, or Yb) is placed there. A transition element excluding Co, Pd and rare-earth elements, i.e., the specified transition element, and/or Al are placed together with Pd at the B site.

The first rare-earth element $A^1$ necessarily placed at the A site is an always trivalent rare-earth element. In other words, the first rare-earth element $A^1$ is a rare-earth element excluding rare-earth elements that can take both trivalence and quadrivalence such as cerium (Ce), praseodymium (Pr) and terbium (Tb) and excluding rare-earth element that can take both bivalence and trivalence such as samarium (Sm), europium (Eu), thulium (Tm) and ytterbium (Yb). Examples of the rare-earth element $A^1$ include scandium (Sc), yttrium (Y), lanthanum (La), neodymium (Nd), promethium (Pm), gadolinium (Gd), dysprosium (Dy), holmium (Ho), erbium (Er), and lutetium (Lu). These rare-earth elements may be used alone or in combination.

Thus, in the perovskite composite oxide of the formula (1), at the A site, the first rare-earth element $A^1$ such as scandium (Sc), yttrium (Y), lanthanum (La), neodymium (Nd), promethium (Pm), gadolinium (Gd), dysprosium (Dy), holmium (Ho), erbium (Er), or lutetium (Lu) is always placed, and the second rare-earth element $A^2$ that can take both trivalence and quadrivalence such as cerium (Ce), praseodymium (Pr) or terbium (Tb) is optionally placed.

By placing no rare-earth element that can have a valence lower than trivalence but the first rare-earth element $A^1$ taking no valence other than trivalence always and placing the second rare-earth element $A^2$ that can take both trivalence and quadrivalence optionally at the A site in the perovskite composite oxide of the formula (1), it become possible to make the Pd stably present in the perovskite structure and accelerate the responses of solid-solutioning of the Pd under an oxidative atmosphere and of precipitation thereof under a reductive atmosphere.

In the formula (1), the atomic proportion of the first rare-earth element $A^1$ ("a" in the formula (1)) is preferably 0.6 to 1 (i.e., the atomic proportion of the second rare-earth element $A^2$ ("1–a" in the formula (1)) is 0.4 to 0), and more preferably 0.8 to 1 (i.e., the atomic proportion of the second rare-earth element $A^2$ is 0.2 to 0). If the atomic proportion of the first rare-earth element $A^1$ at the A site is less than 0.6, stabilization of Pd in the perovskite structure may not be effected in some cases.

As described above, the perovskite composite oxide of the formula (1) includes those in which only the first rare-earth element $A^1$ (a=1 in the formula (1)) is placed at the A site, and those in which both the first rare-earth element $A^1$ and the second rare-earth element $A^2$ (0<a<1 in the formula (1)) are placed at the A site. Of the two, the perovskite composite oxide in which only the first rare-earth element $A^1$ is placed at the A site is preferable. By placing the first rare-earth element $A^1$ alone at the A site, it is possible to further stabilize Pd in the perovskite structure.

Examples of the specified transition metal placed at the B site together with Pd include, but are not limited to, elements in the periodic table (IUPAC, 1990) having an atom number of 22 (Ti) to 30 (Zn), 40 (Zr) to 48 (Cd), and 72 (Hf) to 80 (Hg) (excluding Pd and Co). More specific examples of the transition metals include titanium (Ti), chromium (Cr), manganese (Mn), iron (Fe), nickel (Ni), copper (Cu), and the like. These specified transition elements may be used alone or in combination of two or more.

Thus, a specified transition element such as titanium (Ti), chromium (Cr), manganese (Mn), iron (Fe), nickel (Ni), or copper (Cu) and/or aluminum is placed together with palladium at the B site.

In the perovskite composite oxide of the formula (1), lanthanum, neodymium, yttrium, or a mixture thereof is preferable as the first rare-earth element $A^1$. Lanthanum, neodymium and/or yttrium further stabilize the perovskite structure.

As the element placed at the B site together with palladium, iron, manganese, aluminum, or a mixture thereof is preferable, with iron being more preferable. Iron, manganese and/or aluminum further stabilize the perovskite structure under a reductive atmosphere. In particular, iron not only further stabilizes the perovskite structure, but also can reduce environment load and enhance safety.

In the perovskite composite oxide of the formula (1), an atomic proportion of palladium placed at the B site ("b" in the formula (1)) is preferably more than 0 and less than 0.5. If the atomic proportion of palladium is 0.5 or more, palladium can not be solid-solutioned into the composite oxide composition in some cases, and the cost can not be lowered in some cases.

As apparent from the description above, the perovskite composite oxide for use in the present invention is particularly preferably a perovskite composite oxide represented by a formula (1-1):

$$APd_pB_{1-p}O_3 \tag{1-1}$$

where A represents at least one element selected from the group consisting of lanthanum, neodymium and yttrium; B represents at least one element selected from iron, manganese and aluminum; and p is 0<p<0.5.

Thus, in the perovskite composite oxide of the general formula (1-1), lanthanum, neodymium and yttrium are placed, respectively alone or in combination in arbitrary atomic proportions at the A site. In addition, at the B site, palladium is placed at an atomic proportion of more than 0 and less than 0.5, preferably more than 0 and less than 0.2, and iron, manganese and aluminum are placed respectively alone or in combination at arbitrary atomic proportions such that the total amount thereof corresponds to the balance of the palladium atomic proportion.

The catalyst according to the present invention may comprise a zirconia-based composite oxide, in addition to the zeolite and the Pd-containing perovskite composite oxide. The zirconia-based composite oxide further stabilizes the Pd-containing perovskite composite oxide and maintains the solid-solutioning/precipitation behavior of Pd contained in the Pd-containing perovskite composite oxide more stably for a long period of time. The zirconia-based composite oxide may be present in a state mixed with the Pd-containing perovskite composite oxide, in a state carrying the Pd-containing perovskite composite oxide, and/or in a state mixed in a catalyst layer containing a platinum group noble metal other than Pd described below.

The zirconia-based composite oxide preferably contains, in addition to zirconium, cerium and, optionally, lanthanum and/or an Ln (at least one element selected from the group consisting of neodymium (Nd), praseodymium (Pr) and yttrium (Y)). The zirconia-based composite oxide can be represented by the following formula:

$$Zr_{1-(x+y+z)}Ce_xLa_yLn_zO_2 \quad (2)$$

In the formula (2), x, y and z represent atomic proportions of the respective elements and satisfy the following relationships:

$$0.2 < x+y+z \leq 0.6,$$

$$0.12 \leq x \leq 0.5,$$

$$0 \leq y \leq 0.48,$$

$$0 \leq z \leq 0.48, \text{ and}$$

$$0.08 < y+z \leq 0.48.$$

In addition, a catalyst according to the present invention preferably contains a platinum group noble metal other than Pd. A catalyst containing such a platinum group noble metal can purify the HC, NOx and CO in an exhaust gas more efficiently. Examples of the platinum group noble metal include platinum, rhodium, and the like; and these noble metals may be used alone or in combination. The platinum group noble metal catalyst may be used in a state supported on a carrier such as alumina. Also the zirconia-based composite oxide may be supported on a carrier together with a platinum group noble metal catalyst.

A catalyst according to the present invention is usually supported as a layer on a heat-resistant support, in particular on a monolithic support. Examples of the heat-resistant support include monolithic supports having, in their axial direction, tubular passages in which an exhaust gas flows, such as monolithic honeycomb supports having a plurality of such tubular passages. Such a heat-resistant support can be formed of a heat resistance ceramic material such as cordierite.

A catalyst according to the present invention preferably contains a perovskite composite oxide according to the present invention in an amount of 0.1 to 1 part by weight based on 1 part by weight of zeolite. If the amount of the perovskite composite oxide is less than 0.1 parts by weight, the catalytic performance may become insufficient in some cases. If the amount is more than 1 part by weight, the total coating amount may become too large and hence the ignition characteristics may be lowered in some cases. The perovskite composite oxide is more preferably used in an amount of 0.1 to 0.5 parts by weight based on 1 part by weight of zeolite.

When used together with the perovskite composite oxide in the same layer, the zirconia-based composite oxide is preferably used in an amount of 0.3 to 100 parts by weight with respect to 1 part by weight of the perovskite composite oxide according to the present invention. If the total amount of the zirconia-based composite oxide is less than 0.3 parts by weight, an effect of dispersing the palladium-containing perovskite composite oxide may become insufficient in some cases. If the total amount is more than 100 parts by weight, it may be uneconomical in some cases. The zirconia-based composite oxide is more preferably used in a total amount of 1 to 10 parts by weight with respect to 1 part by weight of the perovskite composite oxide.

Further, the platinum group noble metal other than Pd, when used, is preferably used in an amount of 0.1 to 10 g per liter of the catalyst (0.1 to 10 g/L-cat).

The perovskite composite oxide according to the present invention can be prepared by various methods known per se as producing composite oxides, such as a coprecipitation method, an alkoxide method, and a citrate complex method.

In order to prepare a perovskite composite oxide according to the present invention by the coprecipitation method, an aqueous solution can be prepared, which contains salts (starting metal salts) of the metal elements constituting the perovskite composite oxide (for example, $A^1$, Pd, B' and optional $A^2$ in the formula (1)), and the solution can be added with an aqueous alkaline solution or aqueous organic acid solution to coprecipitate a salt containing the metals constituting the perovskite composite oxide. The starting metals salt used in the coprecipitation method include inorganic salts such as sulfates, nitrates, hydrochlorides, and phosphates; and organic salts such as acetates and oxalates. Preferable salts are nitrate salts. Examples of the aqueous alkaline solution include an aqueous solution of a salt of an alkali metal such as sodium or potassium, an aqueous solution of ammonia or ammonium carbonate, and a known buffer solution. When an aqueous alkaline solution is used, the solution is preferably added such that a solution obtained after the addition of the aqueous metal salt solution exhibits a pH of approximately 8 to 11. Examples of the aqueous organic acid solution include an aqueous solution of oxalic acid, citric acid, or the like.

The coprecipitate obtained may be filtered, washed, dried preferably at 50 to 200° C. for 1 to 48 hours, and baked at 400 to 1000° C., preferably 650 to 1000° C., for 1 to 12 hours, preferably 2 to 4 hours. Thus, a Pd-containing perovskite composite oxide containing the metals at a ratio substantially the same as the mixing ratio of the starting metal salts can be obtained.

In order to prepare a perovskite composite oxide according to the present invention by the alkoxide method, first, a metal alkoxide solution is prepared by dissolving alkoxides of the metal elements constituting the perovskite composite oxide (starting metal alkoxides) in an organic solvent, and the metal alkoxide solution can be added to deionized water to coprecipitate or hydrolyze the metal alkoxides to produce a coprecipitate or hydrolysate.

Examples of the alkoxy forming the alkoxide include an alkoxy such as methoxy, ethoxy, propoxy, isopropoxy, or butoxy; an alkoxyalcoholate such as methoxyethylate, methoxypropylate, methoxybutyrate, ethoxyethylate, ethoxypropylate, propoxyethylate, or butoxyethylate; and the like. Examples of the organic solvent include aromatic hydrocarbons, aliphatic hydrocarbons, alcohols, ketones, esters, or the like. Preferably, aromatic hydrocarbons such as benzene, toluene, or xylene are mentioned.

The coprecipitate or hydrolysate obtained can be filtered, washed, dried, and baked, as in the coprecipitation method. Thus, a perovskite composite oxide containing the metals at a ratio substantially the same as the mixing ratio of the starting metal alkoxide can be obtained.

In order to prepare a Pd-containing perovskite composite oxide by the citrate complex method, an aqueous solution containing the citrate salts of the metal elements constituting the Pd-containing perovskite composite oxide (starting metal citrate salts) can be evaporated to dryness and the dried material can be dried and baked as in the coprecipitation method. Thus, a Pd-containing perovskite composite oxide containing metals at a ratio substantially the same as the mixing ratio of the starting metal citrate salts can be obtained.

The zirconia-based composite oxide for use in the present invention may be prepared by a coprecipitation method, an alkoxide method, or a slurry method, known per se.

In order to prepare the zirconia-based composite oxide by the coprecipitation method, salts of the metal elements constituting the zirconia-based composite oxide are used as the starting metal salts in the production of the Pd-containing perovskite composite oxide by the coprecipitation method. In order to prepare the zirconia-based composite oxide by the alkoxide method, alkoxides of the metal elements constituting the zirconia-based composite oxide are used as the starting metal alkoxides in the production of the perovskite composite oxide by the alkoxide method.

In order to prepare the zirconia-based composite oxide by the slurry method, a slurry is prepared by adding water to cerium oxide powder in an amount of 10 to 50 times the weight of the latter, and an aqueous solution containing zirconium salt and optionally salts of lanthanum and Ln (for example, containing water in an amount of 0.1 to 10 times the total weight of the metal salt) is added to the slurry, which is sufficiently stirred, and dried under a reduced pressure, and then dried and baked as in the coprecipitation method.

The cerium oxide powder for use in the slurry method may be a commercial product, but it preferably has a large specific surface area for improvement in its oxygen storage capacity. For example, the cerium oxide powder can have a specific surface area of 40 to 100 cm$^2$/g. The inorganic and organic acid salts used in the coprecipitation method may be used as the zirconium, lanthanum and Ln salts.

In the baking for preparing the zirconia-based composite oxide, it is preferable that at least a part of the zirconia-based composite oxide forms a solid solution to improve the heat resistance of the zirconia-based composite oxide. The baking conditions suitable for forming the solid solution can be properly determined according to the composition of the zirconia-based composite oxide and the ratio of the components.

In order to carry the perovskite composite oxide of the invention on the zirconia-based composite oxide, though not particularly limited, but for example, a zirconia-based composite oxide may be added at the ratio noted above during the production of the perovskite composite oxide.

More specifically, when the perovskite composite oxide according to the present invention is produced by the coprecipitation method, powder of the zirconia-based composite oxide powder is added to the aqueous solution of the starting metal salts prepared, the resultant mixture is added to the aqueous alkaline solution or organic acid solution to effect coprecipitation, and the obtained coprecipitate can be dried and baked as described above.

When the perovskite composite oxide according to the present invention is prepared by the alkoxide method, powder of the zirconia-based composite oxide is added to the starting metal alkoxide solution prepared, to effect precipitation by hydrolysis, and the obtained precipitates can be dried and baked, as described above.

When the perovskite composite oxide according to the present invention is prepared by the citrate complex method, powder of the zirconia-based composite oxide is added to the aqueous starting metal citrate salt solution prepared and thereafter the aqueous mixed citrate salt solution can be dried to dryness and baked as described above.

The platinum group noble metal catalyst other than palladium is usually used in a state carried on heat-resistant porous carrier particles such as alumina. The carried platinum group noble metal catalyst can be formed by coating an aqueous slurry containing the refractory porous carrier particles and an aqueous solution of a water-soluble noble metal compound such as platinum nitrate or rhodium nitrate, which is dried at a temperature of 200 to 250° C. for about 1 hour, and baked at 450 to 600° C. for about 2 hours. When the zirconia-based composite oxide is caused to be co-present in the noble metal catalyst, powder of the zirconia-based composite oxide may be added to the slurry noted above.

According to a first embodiment of the present invention, the exhaust gas-purifying catalyst according to the present invention has one layer in which the Pd-containing perovskite composite oxide and the zeolite are mixed together, on a heat-resistant support. FIG. 1 is a schematic sectional view illustrating a catalyst according to the first embodiment. A layer 11 in which a perovskite composite oxide according to the present invention and a zeolite are mixed is formed on a heat-resistant support 10. The layer 11 may contain the zirconia-based composite oxide additionally. The zirconia-based composite oxide may be simply contained in the layer 11 or may carry the Pd-containing perovskite composite oxide. It is preferable that a second layer 12 containing a platinum group noble metal other than Pd is formed on the layer 11. A zirconia-based composite oxide may be incorporated into the second layer 12.

The layer 11 of a mixture containing the perovskite composite oxide and a zeolite according to the present invention can be formed by preparing an aqueous slurry by using powder of the perovskite composite oxide according to the present invention and a zeolite together with a binder such as acidic alumina sol, coating the slurry on the surface of the support 10, and drying and then baking the coated slurry at 500° C. to 600° C. for 1 to 2 hours. In this case, when a zirconia-based composite oxide is incorporated into the aqueous slurry, a layer 11 containing the zirconia-based composite oxide together with the powder of the perovskite composite oxide according to the present invention and zeolite powder can be obtained.

According to a second embodiment of the present invention, the exhaust gas-purifying catalyst according to the present invention comprises the perovskite composite oxide according to the present invention and a zeolite as separate layers on the heat-resistance support. Usually, the zeolite-containing layer is formed closer to the support than the perovskite composite oxide.

Figure 2:
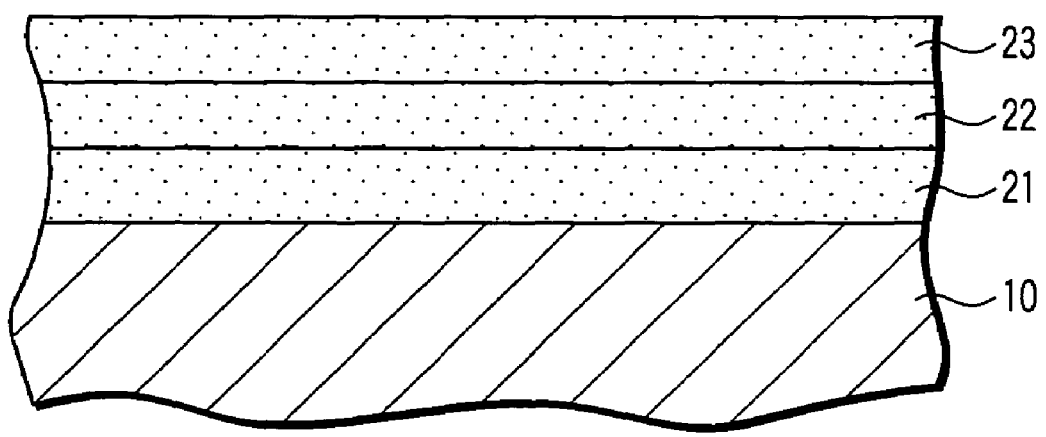
FIG. 2 is a schematic sectional view illustrating a structure of a catalyst according to a second embodiment of the present invention.

FIG. 2 is a schematic sectional view illustrating a catalyst according to the second embodiment. On a heat-resistant support 10, a first layer 21 containing a zeolite is formed, and a second layer 22 containing a Pd-containing perovskite composite oxide is formed thereon. A zirconia-based composite oxide may be incorporated into the second layer 22. It is preferable that a third layer 23 containing a platinum group noble metal other than Pd is formed on the second layer 22. A zirconia-based composite oxide may also be incorporated into the third layer.

The first layer containing a zeolite can be formed by preparing an aqueous slurry by using a zeolite powder, a binder such as acidic silica sol and water, coating the aqueous slurry on the surface of the support 10, and drying and then baking the coated slurry at 500° C. to 600° C. for 1 hours to 2 hours.

The second layer 22 containing the perovskite composite oxide can be formed by preparing an aqueous slurry by using powder of the perovskite composite oxide, a binder such as acidic alumina sol and water, coating the slurry on the surface of the support 10, and drying and then baking the coated slurry at 500° C. to 600° C. for 1 to 2 hours. In this case, powder of the zirconia-based composite oxide may be incorporated into the aqueous slurry.

In the catalyst according to the present invention, HC in the initial cold exhaust gas emitted from a motor vehicle during engine startup is adsorbed on the zeolite, and the Pd in the perovskite composite oxide purifies the HC released from the zeolite during hot. In the perovskite composite oxide, such behavior is repeatedly exhibited for a long period of time that Pd solid solutions into the perovskite composite oxide under an oxidative (lean) atmosphere and Pd precipitates onto the surface of the perovskite composite oxide under a reductive atmosphere, suppressing growth of the particles. Thus, the catalyst according to the present invention is superior in the efficiency of purifying the HC in the cold exhaust gas emitted from a motor vehicle during engine startup and retains its HC-purifying activity for a long period of time.

The present invention will be described below by way of specific Examples. However, the present invention should not be restricted these Examples.

PREPARATION EXAMPLE 1

Preparation of Pd-Containing Perovskite Composite Oxide 40.6 g (0.100 moles) of lanthanum ethoxyethylate and 30.7 g (0.095 moles) of iron ethoxyethylate were placed in a round-bottomed flask having a capacity of 500 mL, added with 200 mL of toluene, and dissolved by stirring, to give a mixed alkoxide solution. Then, a solution prepared by dissolving 1.52 g (0.005 moles) of palladium acetylacetonate in 100 mL of toluene was added to the mixed alkoxide solution above, to give a homogeneous mixture solution containing La, Fe, and Pd.

Then, to this solution, 200 mL of deionized water was added dropwise over approximately 15 minutes. Then, a brown viscous precipitate was formed by hydrolysis.

Then, stirring at room temperature for 2 hours was conducted, and the toluene and water were stripped off under reduced pressure, to provide a precursor of a La—Fe—Pd composite oxide. The precursor was placed in a petri dish, air-dried at 60° C. for 24 hours, and heat-treated in the air using an electric furnace at 650° C. for 2 hours, to give a powder of a Pd-containing perovskite composite oxide of $La_{1.0}Fe_{0.95}Pd_{0.05}O_3$.

PREPARATION EXAMPLE 2

Preparation of Zirconia-Based Composite Oxide 25.6 g (0.076 moles) of zirconium oxychloride, 7.8 g (0.018 moles) of cerium nitrate, 1.7 g (0.002 moles) of lanthanum nitrate and 1.8 g (0.004 moles) of neodymium nitrate were dissolved in 100 mL of deionized water, to give a mixed aqueous solution. The mixed aqueous solution was added gradually dropwise to an aqueous alkaline solution prepared by dissolving 25.0 g of sodium carbonate in 200 mL of deionized water, giving a coprecipitate. The coprecipitate was washed thoroughly with water and filtered, and then dried sufficiently at 80° C. in vacuo. Thereafter, the coprecipitate was heat-treated (calcined) at 800° C. for 1 hour, to give a powder of a zirconia-based composite oxide into which the cerium and lanthanum were solid-solutioned, consisting of $Zr_{0.76}Ce_{0.18}La_{0.02}Nd_{0.04}O_2$.

EXAMPLE 1

A slurry I consisting of 15 g of the Pd-containing perovskite composite oxide powder of Preparation Example 1, 15 g of acidic alumina sol, 100 g of β-zeolite powder and 150 g of water was coated on a monolithic honeycomb cordierite support having a capacity of 1 L, dried at 250° C. for 1 hour, and baked at 500° C. for 1 hour, to give a catalyst A.

EXAMPLE 2

A slurry II consisting of 100 g of β-zeolite powder, 30 g of acidic silica sol and 150 g of water was coated on a monolithic cordierite support having a capacity of 2 L and dried at 250° C. for 1 hour, to form a zeolite layer on the support. Then, a slurry III consisting of 15 g of the Pd-containing perovskite composite oxide powder of Preparation Example 1, 10 g of acidic alumina sol and 20 g of water was coated on surface of the zeolite layer. Thereafter, the slurry III was dried at 250° C. for 1 hour and baked at 500° C. for 1 hour, to give a catalyst B.

EXAMPLE 3

The slurry II prepared in Example 2 was coated on a monolithic honeycomb cordierite support having a capacity of 1 L and baked at 250° C. for 1 hour, to form a zeolite layer on the support. Then, a slurry IV consisting of 60 g of the zirconia-based composite oxide powder of Preparation Example 2 carrying 15 g of the Pd-containing perovskite composite oxide powder of Preparation Example 1, 30 g of acidic alumina sol and 100 g of water was coated on the surface of the zeolite layer. The slurry IV was then dried at 250° C. for 1 hour and baked at 500° C. for 1 hour, to give a catalyst C.

EXAMPLE 4

A slurry V consisting of an aqueous platinum nitrate solution (containing 0.5 g of platinum), an aqueous rhodium nitrate solution (containing 0.25 g of rhodium), 70 g of alumina powder and 80 g of water was coated on the surface of the catalyst C obtained in Example 3, dried at 250° C. for 1 hour and then baked at 500° C. for 1 hour, to give a catalyst D.

EXAMPLE 5

A slurry VI consisting of an aqueous platinum nitrate solution (containing 0.5 g of platinum), an aqueous rhodium nitrate solution (containing 0.25 g of rhodium), 40 g of alumina powder, 30 g of the zirconia-based composite oxide powder of Preparation Example 2 and 80 g of water was coated on the surface of the catalyst C obtained in Example 3, dried at 250° C. for 1 hour and then baked at 500° C. for 1 hour, to give a catalyst E.

COMPARATIVE EXAMPLE 1

A slurry VII consisting of 10 g of the perovskite composite oxide powder of Preparation Example 1, 10 g of acidic alumina sol and 10 g of water was coated on a monolithic honeycomb cordierite support having a capacity of 1 L, dried at 250° C. for 1 hour and baked at 500° C. for 1 hour, to give a catalyst F.

COMPARATIVE EXAMPLE 2

The slurry II prepared in Example 2 was coated on a monolithic support having a capacity of 1 L and dried at 250° C. for 1 hour, to form a zeolite layer on the support. Then, a slurry VIII consisting of an aqueous palladium nitrate solution (containing 0.3 g of palladium), 30 g of acidic alumina sol and 100 g of water was coated on the surface of the above zeolite layer. Thereafter, the slurry VIII was dried at 250° C. for 1 hour and baked at 500° C. for 1 hour, to give a catalyst G.

COMPARATIVE EXAMPLE 3

The slurry V prepared in Example 4 was coated on the surface of the catalyst F prepared in Comparative Example 1, dried at 250° C. for 1 hour and baked at 500° C. for 1 hour, to give a catalyst H.

COMPARATIVE EXAMPLE 4

The slurry V prepared in Example 4 was coated on the surface of the catalyst G prepared in Comparative Example 2, dried at 250° C. for 1 hour and baked at 500° C. for 1 hour, to give a catalyst I.

<Evaluation of Exhaust Gas-Purifying Capacity>

Each of the catalysts A to I prepared in Examples 1 to 9 was mounted on a gasoline engine having a displacement of 4 L, and subjected to an endurance test over 100 hours under the conditions of an inflow gas air fuel ratio of 14.6 and a catalyst inflow gas temperature of 900° C., while a lead-free gasoline was supplied to the engine.

Each of the catalysts A to I was then installed at a site 30 cm directly below the engine of an actual vehicle (displacement: 2.2 L). The engine of the actual vehicle was operated in the U.S. LA #4 mode, the exhaust gas emitted from the engine was purified, and the purification rate of non-methane hydrocarbons (NMHC) in the exhaust gas passing the catalyst was measured. The purification rate was measured by using a motor vehicle exhaust-gas analyzer, while the exhaust gas from the tail pipe was collected by using a chassis dynamo tester. Results are shown in Table 1.

TABLE 1

| Pd-carrying catalyst | NMHC Purification rate (%) | Pt + Pd + Rh-carrying catalyst | NMHC Purification rate (%) |
|---|---|---|---|
| Example 1 (Catalyst A) | 90.2 | Example 4 (Catalyst D) | 96.4 |
| Example 2 (Catalyst B) | 93.5 | Example 5 (Catalyst E) | 98.2 |
| Example 3 (Catalyst C) | 95.3 | Comparative Example 3 (catalyst H) | 84.5 |
| Comparative Example 1 (catalyst F) | 83.0 | Comparative Example 4 (catalyst I) | 90.1 |
| Comparative Example 2 (catalyst G) | 85.5 | | |

Comparison of the results of the purification rate of Comparative Examples 1 to 2 with those of the catalysts of Examples 1 to 3 reveals that, although all of the catalysts contains Pd as a noble metal, the catalyst F of Comparative Example 1 consisting of the Pd-containing perovskite composite oxide alone and the catalyst G of Comparative Example 2 containing Pd and zeolite have NMHC purification rates of 83.0 and 85.5%, and by contrast, the catalysts A to C of Examples 1 to 3 containing the Pd-containing perovskite composite oxide and zeolite have NMHC purification rates all of more than 90%, clearly indicating the synergistic effect of the combined use of a Pd-containing perovskite composite oxide and zeolite. The synergistic effect is also obvious from the comparison of the results of the NMHC purification rate of the catalysts H and I of Comparative Examples 3 and 4 with those of the catalysts D and E of Examples 4 and 5.

Further, comparison of the results of the NMHC purification rate of the catalyst A of Example 1 with those of the catalyst B of Example 2 reveals that forming the Pd-containing perovskite composite oxide and zeolite into separate layers is more preferable than mixing them in a single layer.

Moreover, comparison of the results of the NMHC purification rate of the catalysts A and B of Examples 1 to 2 with those of the catalyst C of Example 3, reveals that it is preferable that the Pd-containing perovskite composite oxide is co-present together with the zirconia-based composite oxide.

Further, comparison of the results of the NMHC purification rate of the catalysts A to C of Examples 1 to 3 with those of the catalysts D and E of Examples 4 and 5 reveals that it is preferable for the catalyst preferably to contain, in addition to Pd, the other platinum group metal.

What is claimed is:

1. An exhaust gas-purifying catalyst comprising a zeolite and a perovskite composite oxide having palladium placed at its B site.

2. The catalyst according to claim 1, wherein the zeolite comprises β-zeolite.

3. The catalyst according to claim 1, wherein the perovskite composite oxide is represented by a formula (1):

$$(A^1)_a(A^2)_{1-a}(Pd)_b(B')_{1-b}O_3 \qquad (1)$$

where $A^1$ represents at least one first rare-earth element selected from the group consisting of rare earth elements taking no valence other than trivalence, $A^2$ represents at least one second rare-earth element selected from the group consisting of rare-earth elements excluding the rare-earth elements that can have a valence lower than trivalence, B' represents at least one element selected from the group consisting of transition elements excluding cobalt, palladium and rare-earth elements, and aluminum, and a and b represent atomic proportions of the respective elements, and $0<a\leqq1$ and $0<b<1$.

4. The catalyst according to claim 1, further comprising a platinum group noble metal other than palladium.

5. The catalyst according to claim 1, wherein the catalyst comprises a first layer and a second layer provided thereon, the first layer contains the zeolite, and the second layer contains the perovskite structure composite oxide.

6. The catalyst according to claim 5, wherein the zeolite comprises β-zeolite.

7. The catalyst according to claim 5, wherein the perovskite composite oxide is represented by a formula (1):

$$(A^1)_a(A^2)_{1-a}(Pd)_b(B')_{1-b}O_3 \qquad (1)$$

where $A^1$ represents at least one first rare-earth element selected from the group consisting of rare-earth elements taking no valence other than trivalence, $A^2$ represents at least one second rare-earth element selected from rare-earth elements excluding those rare-earth element that can take a valence lower than trivalence, B' represents at least one element selected from the group consisting of transition element excluding cobalt, palladium and rare-earth elements, and aluminum, a and b are atom proportions of respective elements, and $0<a\leqq1$ and $0<b<1$.

8. The catalyst according to claim 5, further comprising a third layer, on the second layer, containing a platinum group noble metal other than palladium.

9. The catalyst according to claim 8, wherein the third layer further includes a zirconia-based composite oxide represented by Formula (2):

$$Zr_{1-(x+y+z)}Ce_xLa_yLn_zO_2 \qquad (2)$$

where Ln represents at least one element selected from the group consisting of neodymium, praseodymium and yttrium, and x, y and z represent atomic proportions of respective elements and satisfy the following relationship:

$$0.2<x+y+z\leqq0.6,$$

$$0.12\leqq x\leqq0.5,$$

$$0\leqq y\leqq0.48,$$

$$0\leqq z\leqq0.48, \text{ and}$$

$$0.08<y+z\leqq0.48.$$

10. An exhaust gas-purifying catalyst comprising a zeolite, a perovskite composite oxide having palladium placed at its B site, and a zirconia-based composite oxide represented by a formula (2):

$$Zr_{1-(x+y+z)}Ce_xLa_yLn_zO_2 \tag{2}$$

where Ln represents at least one element selected from the group consisting of neodymium, praseodymium and yttrium, and x, y and z represent atomic proportions of respective elements and satisfy the following relationship:

$0.2<x+y+z\leq0.6$, $0.12\leq x\leq0.5$, $0\leq y\leq0.48$, $0\leq z\leq0.48$, and $0.08<y+z\leq0.48$.

11. The catalyst according to claim 10, wherein the zeolite comprises β-zeolite.

12. The catalyst according to claim 10, wherein the perovskite compositeoxide is represented by a formula (1):

$$(A^1)_a(A^2)_{1-a}(Pd)_b(B')_{1-b}O_3 \tag{1}$$

where $A^1$ represents at least one first rare-earth element selected from the group consisting of rare earth elements taking no valence other than trivalence, $A^2$ represents at least one second rare-earth element selected from the group consisting of rare-earth elements excluding the rare-earth elements that can have a valence lower than trivalence, B' represents at least one element selected from the group consisting of transition elements excluding cobalt, palladium and rare-earth elements, and aluminum, and a and b represent atomic proportions of the respective elements, and $0<a\leq1$ and $0<b<1$.

13. The catalyst according to claim 10, wherein the perovskite composite oxide is carried on the zirconia-based composite oxide.

14. The catalyst according to claim 10, further comprising a platinum group noble metal other than palladium.

15. The catalyst according to claim 10, wherein the catalyst comprises a first layer and a second layer provided thereon, the first layer contains the zeolite, and the second layer contains the perovskite structure composite oxide and the zirconia-based composite oxide.

16. The catalyst according to claim 15, wherein the zeolite comprises β-zeolite.

17. The catalyst according to claim 15, wherein the perovskite composite oxide is represented by a formula (1):

$$(A^1)_a(A^2)_{1-a}(Pd)_b(B')_{1-b}O_3 \tag{1}$$

where $A^1$ represents at least one first rare-earth element selected from the group consisting of rare-earth elements taking no valence other than trivalence, $A^2$ represents at least one second rare-earth element selected from rare-earth elements excluding those rare-earth element that can take a valence lower than trivalence, B' represents at least one element selected from the group consisting of transition element excluding cobalt, palladium and rare-earth elements, and aluminum, a and b are atom proportions of respective elements, and $0<a\leq1$ and $0<b<1$.

18. The catalyst according to claim 15, wherein the perovskite composite oxide is carried on the zirconia-based composite oxide.

19. The catalyst according to claim 15, further comprising a third layer, on the second layer, containing a platinum group noble metal other than palladium.

20. The catalyst according to claim 19, wherein the third layer further includes a zirconia-based composite oxide represented by Formula (2):

$$Zr_{1-(x+y+z)}Ce_xLa_yLn_zO_2 \tag{2}$$

where Ln represents at least one element selected from the group consisting of neodymium, praseodymium and yttrium, and x, y and z represent atomic proportions of respective elements and satisfy the following relationship:

$0.2<x+y+z\leq0.6$, $0.12\leq x\leq0.5$, $0\leq y\leq0.48$, $0\leq z\leq0.48$, and $0.08<y+z\leq0.48$.

21. The catalyst according to claim 10, wherein the perovskite composite oxide is represented by a formula (1-1):

$$APd_pB_{1-p}O_3 \tag{1-1}$$

where A represents at least one element selected from the group consisting of lanthanum, neodymium and yttrium; B represents at least one element selected from iron, manganese and aluminum; and p is $0<p<0.5$.

22. The catalyst according to claim 10, wherein the perovskite composite oxide is present in an amount of 0.1 to 1 part by weight per part by weight of the zeolite, and the zirconia-based composite oxide is present in an amount of 0.3 to 100 parts by weight per part by weight of the perovskite composite oxide.

23. The catalyst according to claim 14, wherein the platinum group noble metal is present in an amount of 0.1 to 10 g per liter of catalyst.

* * * * *